United States Patent
Can et al.

(10) Patent No.: US 8,318,082 B2
(45) Date of Patent: *Nov. 27, 2012

(54) CUBIC BORON NITRIDE COMPACT

(75) Inventors: Nedret Can, Boksburg (ZA); Stig Ake Andersin, Robertsfors (SE)

(73) Assignee: Element Six Abrasives S.A., Luxembourg (LU)

( * ) Notice: Subject to any disclaimer, the term of this patent is extended or adjusted under 35 U.S.C. 154(b) by 1228 days.

This patent is subject to a terminal disclaimer.

(21) Appl. No.: 11/718,119

(22) PCT Filed: Oct. 28, 2005

(86) PCT No.: PCT/IB2005/003230

§ 371 (c)(1),
(2), (4) Date: Oct. 29, 2007

(87) PCT Pub. No.: WO2006/046128

PCT Pub. Date: May 4, 2006

(65) Prior Publication Data

US 2009/0181238 A1   Jul. 16, 2009

(30) Foreign Application Priority Data

Oct. 29, 2004 (IE) .................. S2004/0721
Oct. 29, 2004 (IE) .................. S2004/0722

(51) Int. Cl.
*C22C 32/00* (2006.01)
*B22F 1/02* (2006.01)
*C09K 3/14* (2006.01)

(52) U.S. Cl. ............... 419/10; 419/13; 419/32; 419/33; 51/307; 51/309

(58) Field of Classification Search .............. None
See application file for complete search history.

(56) References Cited

U.S. PATENT DOCUMENTS

| 4,334,928 A | 6/1982 | Hara et al. |
| 4,788,166 A | 11/1988 | Araki et al. |
| 5,536,485 A | 7/1996 | Kume et al. |
| 6,316,094 B1 | 11/2001 | Fukaya et al. |
| 7,867,438 B2 * | 1/2011 | Can et al. .................. 419/10 |

FOREIGN PATENT DOCUMENTS

| JP | 53077811 | 7/1978 |
| JP | 61 183167 | 8/1986 |
| JP | 7-53282 | 2/1995 |
| JP | 2000-44347 | 2/2000 |
| JP | 2000-044347 | 2/2000 |
| JP | 2000-44348 | 2/2000 |
| JP | 2000044348 | 2/2000 |
| JP | 2000044350 | 2/2000 |
| JP | 2000 247746 | 9/2000 |
| JP | 2000-247746 | 9/2000 |
| WO | 2005 082809 | 9/2005 |

OTHER PUBLICATIONS

U.S. Appl. No. 11/718,281, filed Apr. 30, 2007, Can, et al.
U.S. Appl. No. 11/718,249, filed Apr. 30, 2007, Can, et al.

* cited by examiner

*Primary Examiner* — Sheeba Ahmed
(74) *Attorney, Agent, or Firm* — Oblon, Spivak, McClelland, Maier & Neustadt, L.L.P.

(57) ABSTRACT

A composition containing:
about 45 to about 75 volume % of cubic boron nitride (CBN), where the CBN has finer and coarser particles having two different average particle sizes, the range of the average particle size of the finer particles being about 0.1 to about 2 µm, the range of the average particle size of the coarser particles being about 0.3 to about 5 µm, the ratio of the content of the coarser CBN particles to the finer CBN particles being 50:50 to 90:10;
a secondary hard phase containing a nitride or carbonitride of a Group 4, 5 or 6 transition metal or a mixture or solid solution thereof, and
a binder phase.

10 Claims, No Drawings

CUBIC BORON NITRIDE COMPACT

This application is a 371 of PCT/IB05/03230, filed Oct. 28, 2005.

BACKGROUND OF THE INVENTION

This invention relates to a composition for use in the manufacture of cubic boron nitride abrasive compacts, and specifically to compacts with enhanced wear resistance, and increased chip resistance.

Boron nitride exists typically in three crystalline forms, namely cubic boron nitride (CBN), hexagonal boron, nitride (hBN) and wurtzitic cubic boron nitride (wBN). Cubic boron nitride is a hard zinc blende form of boron nitride that has a similar structure to that of diamond. In the CBN structure, the bonds that form between the atoms are strong, mainly covalent tetrahedral bonds. Methods for preparing CBN are well known in the art. One such method is subjecting hBN to very high pressures and temperatures, in the presence of a specific catalytic additive material, which may include the alkali metals, alkaline earth metals, lead, tin and nitrides of these metals. When the temperature and pressure are decreased, CBN may be recovered.

CBN has wide commercial application in machining tools and the like. It may be used as an abrasive particle in grinding wheels, cutting tools and the like or bonded to a tool body to form a tool insert using conventional electroplating techniques.

CBN may also be used in bonded form as a CBN compact. CBN compacts tend to have good abrasive wear, are thermally stable, have a high thermal conductivity, good impact resistance and have a low coefficient of friction when in contact with iron containing metals.

Diamond is the only known material that is harder than CBN. However, as diamond tends to react with certain materials such as iron, it cannot be used when working with iron containing metals and therefore use of CBN in these instances is preferable.

CBN compacts comprise sintered masses of CBN particles. When the CBN content exceeds 80 percent by volume of the compact, there is a considerable amount of CBN-to-CBN contact and bonding. When the CBN content is lower, e.g. in the region of 40 to 60 percent by volume of the compact, then the extent of direct CBN-to-CBN contact and bonding is less. CBN compacts will generally also contain a binder phase for example aluminium, silicon, cobalt, nickel, and -titanium.

When the CBN content of the compact is less than 70 percent by volume there is generally present another hard phase, a secondary phase, which may be ceramic in nature. Examples of suitable ceramic hard phases are carbides, nitrides, borides and carbonitrides of a Group 4, 5 or 6 transition metal (according to the new IUPAC format), aluminium oxide, and carbides such as tungsten carbide and mixtures thereof. The matrix constitutes all the ingredients in the composition excluding CBN.

CBN compacts may be bonded directly to a tool body in the formation of a tool insert or tool. However, for many applications it is preferable that the compact is bonded to a substrate/support material, forming a supported compact structure, and then the supported compact structure is bonded to a tool body. The substrate/support material is typically a cemented metal carbide that is bonded together with a binder such as cobalt, nickel, iron or a mixture or alloy thereof. The metal carbide particles may comprise tungsten, titanium or tantalum carbide particles or a mixture thereof.

A known method for manufacturing the CBN compacts and supported compact structures involves subjecting an unsintered mass of CBN particles, to high temperature and high pressure conditions, i.e. conditions at which the CBN is crystallographically stable, for a suitable time period. A binder phase may be used to enhance the bonding of the particles. Typical conditions of high temperature and pressure (HTHP) which are used are temperatures in the region of 1100° C. or higher and pressures of the order of 2 GPa or higher. The time period for maintaining these conditions is typically about 3 to 120 minutes.

The sintered CBN compact, with or without substrate, is often cut into the desired size and/or shape of the particular cutting or drilling tool to be used and then mounted on to a tool body utilising brazing techniques.

CBN compacts are employed widely in the manufacture of cutting tools for finish machining of hardened steels, such as case hardened steels, ball-bearing steels and through hardened engineering steels. In addition to the conditions of use, such as cutting speed, feed and depth of cut, the performance of the CBN tool is generally known to be dependent on the geometry of the workpiece and in particular, whether the tool is constantly engaged in the workpiece for prolonged periods of time, known in the field as "continuous cutting", or whether the tool engages the workpiece in an intermittent manner, generally known in the field as "interrupted cutting".

Depending on the workpiece geometry, it is common for the CBN tool to experience both continuous and interrupted cutting within a process cycle and furthermore, the ratio of continuous to interrupted cutting varies widely in the field. After extensive research in this field it was discovered that these different modes of cutting place very different demands on the CBN material comprising the cutting edge of the tool. The main problem is that the tools tend to fail catastrophically by fracturing or chipping, exacerbated by an increasing demand in the market for higher productivity through increased cutting speeds and therefore the tool has a limited tool life.

U.S. Pat. No. 6,316,094 discloses a CBN sintered body in which CBN particles of a single average particle size are bonded through a bonding phase. A powdered composition is sintered to produce the sintered body. This powdered composition is made using various mixing methods such as ultrasonic mixing and attrition milling. Attrition milling is shown to be the poorest mixing method.

U.S. Pat. No. 4,334,928 discloses a boron nitride sintered compact comprising CBN particles and various titanium containing compounds. The titanium containing compounds are typically pre-reacted and formed into a sintered compact which is then crushed. The CBN compact further contains CBN having a single average particle size. Relatively low temperatures are used in the sintering process to produce the CBN compact.

SUMMARY OF THE INVENTION

According to a first aspect of the invention, there is provided a composition for use in producing a CBN compact comprising:
  about 45 to about 75 volume % CBN, typically 45 to 70 volume %, where the CBN is comprised of particles of more than one average particle size;
  a secondary hard phase including a compound containing nitride, carbonitride or carbide of a Group 4, 5 or 6 transition metal or a solid solution or a mixture thereof; and a binder phase;
where typically the binder phase is present in an amount of about 5 to 30 weight % of the secondary hard phase.

The volume of CBN present in the composition is preferably from 50 to 65%. The average particle size of the CBN is usually less than 10 μm and preferably less than 5 μm.

The CBN is preferably bimodal, i.e. it consists of particles with two average sizes. The range of the average particle size of the finer particles is usually from about 0.1 to about 2 μm and the range of the average particle size of the coarser particles is usually from about 0.3 to about 5 μm. The ratio of the content of the coarser CBN particles to the finer particles is typically from 50:50 to 90:10.

The composition of the invention contains CBN, a secondary hard phase and binder phase and may also contain other incidental impurities, including oxide phases, in minor amounts. Tungsten carbide, which acts as a grain growth inhibitor, may be present particularly when the composition is milled with tungsten carbide balls. The tungsten carbide, when present, typically does not exceed 3% by volume.

The metal of the nitride, carbonitride or carbide is a Group 4, 5 or 6 transition metal, preferably titanium.

The binder phase will preferably consist of aluminium and optionally one or more of other elements, chosen from silicon, iron, nickel, cobalt, titanium, tungsten, niobium and molybdenum, which may be alloyed, compounded or formed in solid solution with the aluminium. Other binder phases may, however, be used.

The secondary hard phase may be substoichiometric. In this event it may be pre-reacted with the binder phase e.g. aluminium. This will lead to a reaction product of the stoichiometric secondary hard phase and transition metal aluminides and any unreacted binder phase.

The composition described above is preferably produced by a method which involves optimised powder processing such as attrition milling and in particular two stage attrition milling; first stage milling for breakdown of secondary hard phase particles and binder phase, and subsequently, second stage attrition milling for homogeneous mixing of CBN and the other matrix materials. Thereafter the composition may be subjected to heat treatment to minimise contaminants in the composition.

According to a second aspect of the invention, a method of producing a CBN compact includes subjecting a composition as described above to conditions of elevated temperature and pressure suitable to produce a CBN compact. Such conditions are those at which CBN is crystallographically stable and are known in the art.

The composition may be placed on a surface of a substrate, prior to the application of the elevated temperature and pressure conditions. The substrate will generally be a cemented metal carbide substrate.

According to another aspect of the invention, there is provided a CBN compact which comprises CBN and a matrix phase, wherein the CBN grain size volume frequency distribution has a distribution spread expressed as d90-d10 of 1 micron or greater, and the d90 maximum value is 5 micron or less, preferably 3.5 micron or less, more preferably 2.5 micron or less.

The matrix phase will preferably contain a secondary hard phase and a binder phase, as described above, together with any reaction products between the secondary hard phase, the binder phase and the CBN.

The binder phase is typically present in an amount of about 5 to 30 weight % of the secondary hard phase in the matrix.

DETAILED DESCRIPTION OF PREFERRED EMBODIMENTS

The present invention concerns the manufacturing of CBN abrasive compacts. The composition or starting material used in producing the CBN compact comprises CBN, which consists of particles of more than one average particle size, a secondary hard phase which will include a Group 4, 5 or 6 compound; containing nitride, carbonitride or carbide, or a mixture or solid solution thereof and a binder phase. The secondary hard phase will typically consist of a Group 4, 5 or 6 compound; containing nitride, carbonitride or carbide, or a mixture or solid solution thereof. The composition may contain other minor components such as aluminium oxide or tungsten carbide and other incidental impurities such as Nb, Ta or Mo. Tungsten carbide, which acts as a grain growth inhibitor, may be present particularly when the composition is milled with tungsten carbide balls. The tungsten carbide, when present, typically does not exceed 3% by volume.

The CBN will contain multimodal particles i.e. at least two types of CBN particles that differ from each other in their average particle size. "Average particle size" means the major amount of the particles will be close to the specified size although there will be a limited number of particles further from the specified size. The peak in distribution of the particles will have a specified size. Thus, for example if the average particle size is 2 μm, there will by definition be some particles which are larger than 2 μm, but the major amount of the particles will be at approximately 2 μm in size and the peak in the distribution of the particles will be near 2 μm.

The use of multimodal, preferably bimodal, CBN in the composition ensures that the matrix is finely divided to reduce the likelihood of flaws of critical size being present in the pre-sintered composition. This is beneficial for both toughness and strength in the compact produced from the composition. Obtaining a matrix material of small particle size, typically 0.5 μm, is achieved through mechanical means during pre-processing, specifically by attrition milling of the secondary hard phase, aluminium, any other binder metal and incidental impurities.

Milling in general as a means of comminution and dispersion is well known in the art. Commonly used milling techniques used in grinding of ceramic powders include conventional ball mills and tumbling ball mills, planetary ball mills and attrition ball mills and agitated or stirred ball mills.

In conventional ball milling the energy input is determined by the size and density of the milling media, the diameter of the milling pot and the speed of rotation. As the method requires that the balls tumble, rotational speeds, and therefore energy are limited. Conventional ball milling is well suited to milling of powders of low to medium particle strength. Typically, conventional ball milling is used where powders are to be milled to a final size of around 1 micron or more.

In planetary ball milling, the planetary motion of the milling pots allows accelerations of up to 20 times of gravitational acceleration, which, where dense media are used, allows for substantially more energy in milling compared to conventional ball milling. This technique is well suited to comminution in particles of moderate strength, with final particle sizes of around 1 micron.

Attrition mills consist of an enclosed grinding chamber with an agitator that rotates at high speeds in either a vertical or horizontal configuration. Milling media used are typically in the size range 0.2 to 15 mm and, where comminution is the main objective, milling media typically are cemented carbides, with high density. The high rotational speeds of the agitator, coupled with high density, small diameter media, provide for extremely high energy. Furthermore, the high energy in attrition milling results in high shear in the slurry, which provides for very successful co-dispersion, or blending of powders. Attrition milling achieves finer particles and better homogeneity than the other methods mentioned.

The finer secondary hard phase and binder phase grains have high specific surface area and therefore reactivity, leading to very good sintering between the CBN and secondary hard phase particles. Likewise the small size of the secondary hard phase particles gives them high specific surface area, and hence good binding between secondary hard phase particles as well. This high specific surface area effect imparts high strength to the final structure, without sacrificing the necessary toughness.

The very fine CBN particles in the typically bimodal distribution provide the further benefit of inhibiting grain growth of matrix material, apparently by pinning grain boundaries during sintering at the elevated temperature and pressure conditions as described above.

The use of the attrition milling, particularly two step attrition milling, to achieve the required particle sizes in the pre-sintered composition, along with heat treatment for several hours in a vacuum furnace, substantially reduces contaminants in the pre-sintered compact.

Typical conditions of elevated temperature and pressure necessary to produce CBN compacts are well known in the art. These conditions are pressures in the range of about 2 to about 6 GPa and temperatures in the range of about 1100° C. to about 2000° C. Conditions found favourable for the present invention fall within about 4 to about 6 GPa and about 1200 to about 1600° C.

The use of multimodal CBN has been found to produce a CBN compact which has excellent toughness and high strength. This compact forms another aspect of the invention and has a CBN grain size volume frequency distribution where the distribution spread expressed as d90-d10 of 1 micron or greater, and the d90 maximum value is 5 micron or less, preferably 3.5 micron or less, more preferably 2.5 micron or less.

The CBN compact also has a matrix phase which may contain a secondary hard phase which will include a compound containing nitride, carbonitride or carbide of a Group 4, 5 or 6 transition metal or a solid solution or a mixture thereof, for example titanium carbonitride. The matrix may further comprise a binder phase which consists of aluminium and optionally one or more of other elements, chosen from silicon, iron, nickel, cobalt, titanium, tungsten, niobium and molybdenum, which is alloyed, compounded or formed in solid solution with the aluminium. The binder phase is typically present in an amount of about 5 to 30 weight % of the secondary hard phase in the matrix. During manufacture of the compact there will be some reaction between the various components, i.e. the CBN, the secondary hard phase and the binder phase. The matrix will also contain some of these reaction products.

d10 represents the grain size under which 10 percent of the measured grains (by volume) will lie. Similarly, d90 represents the grain size under which 90 percent (by volume) of the measured grains will lie. The spread is therefore defined as the grain size range where 80 percent by volume of analysed grain sizes fall i.e. the difference between the d90 and d10 values (i.e. d90-d10). CBN grains that are finer than the d10 value and coarser than the d90 value may be atypical to the distribution i.e. be outliers. Hence the distribution spread is selected as that grain size range that falls between the d10 and d90 values for a given CBN compact.

In order to obtain the d10, d90 and d90-d10 values, a sample piece is cut by using wire EDM and polished. The polished surface of the CBN compact is analysed using Scanning Electron Microscope. Back-scatter electron images at a suitable magnifications, 3000, 5000 and 7000 times magnifications are selected depending on the average estimated CBN grain size. If the average grain size is less than one micron, 7000 times magnification is used; if the average grain size is greater than 1 micron and less than 2 microns, 5000 times magnification is used. If the average grain size is greater than 2 micron and less than 3 micron, 3000 times magnification is used. At least 30 images are used for the analysis in order to statistically represent the sample.

The collected grey scale images are analysed in steps. First, grey scale image are electronically processed to identify CBN grains in the microstructure. Then, the identified CBN grains are further separated, and finally, individual grain area is measured and converted to an equivalent circle diameter (ECD). Typically, 10 000 CBN grain size measurements are done on a given material.

The equivalent circle diameter measurement data is further converted to equivalent sphere volume. The percent cumulative volume distribution curve with 0.1 micron size binning is then obtained using conventional statistical processing of the data. The corresponding grain size for d10 and d90 values are obtained by drawing straight lines from 10 and 90 volume percentages on the y-axis and reading the corresponding grain size off the x-axis of the cumulative volume distribution curve.

Compacts produced from the composition of the invention and a described above have particular application in continuous and light-interrupted and medium to heavy interrupted machining of hardened steels such as case-hardened and ball-bearing steels.

The invention will now be described, by way of example only, with reference to the following non-limiting examples.

EXAMPLES

Example 1

A sub-stoichiometric titanium carbonitride powder (Ti$(C_{0.3}N_{0.7})_{0.8}$ of average particle size of 1.4 micron was mixed with Al powder, average particle size of 5 micron, using tubular mixer. The mass ratio between Ti$(C_{0.3}N_{0.7})_{0.8}$ and Al was 90:10. The powder mixture was pressed into a titanium cup to form a green compact and heated to 1025° C. under vacuum for 30 minutes and then crushed and pulverized. The powder mixture was then attrition milled for 4 hours. A CBN powder mixture, containing about 30 wt % CBN with average particle size of 0.7 micron and remaining CBN with average particle size of 2 micron, was added into the slurry at a certain amount to obtain overall 60 volume percent CBN. The CBN containing slurry was milled and mixed for an hour using attrition milling. The slurry was dried under vacuum and formed into a green compact and was sintered at 55 kbar (5.5 GPa) and about 1300° C. to produce a CBN compact.

Comparative Example 1

Material 1A

A sub-stoichiometric titanium carbonitride powder, (Ti$(C_{0.3}N_{0.7})_{0.8}$ of average particle size of 1.4 micron was mixed with Al powder, average particle size of 5 micron, using tubular mixer. The mass ratio between Ti$(C_{0.3}N_{0.7})_{0.8}$ and Al was 90:10. The powder mixture was pressed into a titanium cup to form a green compact and heated to 1025° C. under vacuum for 30 minutes and then crushed and pulverized. The powder mixture was then attrition milled for 4 hours and 0.7 micron average particle size of CBN was added and attrition milled in hexane for an hour. The amount of CBN was added in such a way that the total volume percentage of calculated CBN in the mixture was about 60 percent. The slurry was dried under vacuum and formed into a green compact and was sintered at 55 kbar (5.5 GPa) and about 1300° C. to produce a CBN compact.

This compact and the compact produced in Example 1 (referred to hereinafter as Material 1B) were analysed and compared in a machining test.

A sample piece from each material was cut by using wire EDM and polished. The polished surface of the CBN compact was analysed using Scanning Electron Microscope. Backscatter electron images at 5000 and 7000 times magnifications, Material 1B and Material 1A, respectively, were taken and at least 30 images were analysed using image analyses as described previously. The results are summarised in Table 1. Material 1B had a significantly broader CBN grain size range (having a distribution spread of 1.388 micron) than Material 1A.

TABLE 1

Summary of CBN grain size analysis results

|  | Material 1A | Material 1B |
|---|---|---|
| d10 | 0.296 | 0.832 |
| d90 | 0.875 | 2.22 |
| Distribution spread (d90-d10) | 0.579 | 1.388 |

The sintered compacts were both cut using wire EDM and ground to form cutting inserts. SAE 8620 case hardened steel of 60HRC was continuously machined using cutting speeds of 150 m/min with a feed rate of 0.1 mm/rev and depth of cut of 0.2 mm.

The cutting test was continued until the cutting edge failed by edge fracture or edge chipping and total cutting distance was measured as an indication of cutting tool performance. None of the tested tools failed as a result of excessive flank wear.

Material 1A and Material 1B cutting performances were evaluated using the machining test as described above at a cutting speed of 150 m/min. The performance of Material 1A was 4872 m on average as cutting distance, whereas Material 1B surprisingly had on average a cutting distance of 6615 m. The achieved improvement with Material 1B corresponds to about 36% in relation to Material 1A. Material 1B therefore significantly improved tool life in continuous cutting of hardened steel by improving chipping or fracture resistance of the cutting tool.

A second machining test was performed using cutting tool inserts prepared from Material 1A and Material 1B according to ISO standard geometry, SNMN090308 S0220. The workpiece was selected as ball bearing steel of SAE 100Cr6 in the form of a tube of 40 mm outside diameter and 18.3 mm inside diameter. The 'test' section of the workpiece was 50 mm in length. Two square grooves (10 mm by 15 mm in cross-section) were ground on one face of the tube, parallel to a radial line.

Machining test was performed at a cutting speed of 150 m/min, at a depth of cut of 0.2 mm and a feed rate of 0.1 mm. The heavy interrupted cutting of workpiece took place by facing the cross section of the tube material. A "pass" was defined as machining of the tube cross section from outer diameter to inner diameter and tool performance was measured by counting the number of passes before the tool edge was fractured due to heavy interrupted nature of cutting. The cutting forces were monitored in order to identify tool edge breakage.

The performance of Material 1A on average was 76 passes whereas Material 1B performed about 25% more number of passes, average tool life was 101 passes.

Example 2

A sub-stoichiometric titanium carbonitride powder (Ti$(C_{0.5}N_{0.5})_{0.8}$ of average particle size of 1.4 micron was mixed with Al powder, average particle size of 5 micron, using tubular mixer. The mass ratio between Ti$(C_{0.5}N_{0.5})_{0.8}$ and Al was 90:10. The powder mixture was pressed into a titanium cup to form a green compact and heated to 1025° C. under vacuum for 30 minutes and then crushed and pulverized. The powder mixture was then attrition milled for 4 hours.

A CBN powder mixture, containing about 30 wt % CBN with average particle size of 0.7 micron and remaining CBN with average particle size of 1.4 micron, was added into the slurry to obtain overall 55 volume percent CBN. The CBN containing slurry was milled and mixed for an hour using attrition milling. The slurry was dried under vacuum and formed into a green compact and was sintered at 55 kbar (5.5 GPa) and about 1300° C. to produce a CBN compact.

Comparative Example 2

Material 2A

A sub-stoichiometric titanium carbonitride powder, (Ti$(C_{0.5}N_{0.5})_{0.8}$ of average particle size of 1.4 micron was mixed with Al powder, average particle size of 5 micron, using tubular mixer. The mass ratio between Ti$(C_{0.5}N_{0.5})_{0.8}$ and Al was 90:10. The powder mixture was pressed into a titanium cup to form a green compact and heated to 1025° C. under vacuum for 30 minutes and then crushed and pulverized. The powder mixture was then attrition milled for 4 hours and 0.7 micron average particle size of CBN was added and attrition milled in hexane for an hour. The amount of CBN was added in such a way that the total volume percentage of CBN in the mixture was about 55 percent. The slurry was dried under vacuum and formed into a green compact and was sintered at 55 kbar (5.5 GPa) and about 1300° C. to produce a CBN compact.

This compact and the compact produced in Example 2 (hereinafter referred to as Material 2B) were analysed and compared in a machining test. A sample piece from each material was analysed using image analysis as described in Comparative Example 1. The results are summarised in Table 2. Material 2B had a significantly broader CBN grain size range, (having a distribution spread of 1.254 micron), than Material 2A.

TABLE 2

Summary of CBN grain size analysis
results for Materials 2A and 2B

|  | Material 2A | Material 2B |
|---|---|---|
| d10 | 0.285 | 0.57 |
| d90 | 0.882 | 1.824 |
| Distribution spread (d90-d10) | 0.597 | 1.254 |

The sintered compacts were both cut using wire EDM and ground to form cutting inserts with standard ISO insert geometries as SNMN090308 with 200 micron chamfer width and 20 degrees angle and a hedge hone of 15 to 20 micron.

SAE 4340 hardened steel of 52HRC was machined using cutting speeds of 150 m/min with a feed rate of 0.15 mm/rev and depth of cut of 0.2 mm. The workpiece material was a cylindrical shape with outside diameter of 110 mm and inside diameter of 55 mm. It also contained 6 holes with 10 mm diameter at equal distance between outside and inside diameter and equal distance between the holes. Machining operation was a face turning operation where cutting speed was kept constant across the diameter of the workpiece. The machining operation was alternating continuous and interrupted cutting where the cutting tool edge pass through the holes and continuous part of the workpiece material.

The cutting test was continued until the cutting edge failed by edge fracture or edge chipping and number of facing cuts (one facing cut is equal to total distance cutting from outside diameter to inside diameter of the workpiece) were counted as an indication of cutting tool performance. None of the tested tools failed as a result of excessive flank wear.

Material 2A and Material 2B cutting performances were evaluated using the machining test as described above at a cutting speed of 150 m/min. The performance of Material 2A was 19 facing cuts whereas Material 2B surprisingly lasted for an average of 28 facing cuts. The achieved improvement with Material 2B corresponds to about 50% improvement in tool performance in relation to Material 2A. Material 2B with a bi-modal CBN grain size significantly improved tool life in cutting operation which involved severe interrupted cutting and continuous cutting by improving chipping or fracture resistance of the cutting tool.

Example 3

A sub-stochiometric titanium carbonitride, $TiN_{0.7}$ of average particle size of 1.4 micron was mixed with Al powder, average particle size of 5 micron, using tubular mixer. The mass ratio between $TiN_{0.7}$ and Al was 90:10. The powder mixture was pressed into a titanium cup to form a green compact and heated to 1025° C. under vacuum for 30 minutes and then crushed and pulverized.

The powder mixture was then attrition milled for 4 hours. A CBN powder mixture, containing about 30 wt % CBN with average particle size of 0.7 micron and remaining CBN with average particle size of 2 micron, was added into the slurry at a certain amount to obtain overall 60 volume percent CBN. The CBN added mixture was attrition milled in hexane an hour. The slurry was dried under vacuum and formed into a green compact and was sintered at 55 kbar (5.5 GPa) and at around 1300° C. to produce a CBN compact.

Comparative Example 3

Material 3A

A sub-stoichiometric titanium nitride, $TiN_{0.7}$ of average particle size of 1.4 micron was mixed with Al powder, average particle size of 5 micron, using tubular mixer. The mass ratio between $TiN_{0.7}$ and Al was 90:10. The powder mixture was pressed into a titanium cup to form a green compact and heated to 1025° C. under vacuum for 30 minutes and then crushed and pulverized. The powder mixture was then attrition milled for 4 hours and 0.7 micron average particle size of CBN was added and attrition milled in hexane an hour. The amount of CBN was added in such a way that the total volume percentage of calculated CBN in the mixture was about 60 percent. The slurry was dried under vacuum and formed into a green compact and was sintered at 55 kbar (5.5 GPa) and at around 1300° C. to produce a CBN compact.

This compact and the compact produced in Example 3 (hereinafter referred to as Material 3B) were analysed and compared in a machining test.

A sample piece from each material was analysed using image analysis as per the previous examples. The results are summarised in Table 3. Material 3B had a significantly broader CBN grain size range shaving a distribution spread of 1.444 micron), than Material 3A.

TABLE 3

Summary of CBN grain size analysis
results for Materials 3A and 3B

|  | Material 3A | Material 3B |
|---|---|---|
| d10 | 0.253 | 0.876 |
| d90 | 0.796 | 2.32 |
| Distribution spread (d90-d10) | 0.543 | 1.444 |

The sintered compacts were both cut using wire EDM and ground to form cutting inserts with standard ISO insert geometries as SNMN090308 with 200 micron chamfer width and 20 degrees angle and a hedge hone of 15 to 20 micron.

A powder metallurgy alloy of high Cr steel material was used for continuous cutting experiments. The workpiece material (K190) contains about 30 vol % abrasive carbide phases in a soft ferrite matrix. Therefore, this material is very abrasive and leads to appreciable amount of flank wear.

The test bar was machined using cutting speeds of 150 m/min with a feed rate of 0.1 mm/rev and depth of cut of 0.2 mm. The workpiece is divided into sections of 80 mm in length of round test bars machining test involved continuous cutting of round bar of 80 mm in length. The cutting test was continued until the cutting edge reached to approximately 300 micron maximum flank wear (Vb max). The total cutting distance was measured and normalised to corresponding 300 micron maximum flank wear. All of the tools were failed by excessive flank wear.

Material 3A and Material 3B cutting performances were evaluated using the machining test as described above at a cutting speed of 150 m/min. The performance of Material 3A was 992 m cutting distance whereas Material 3B performed a cutting distance of 1473 m. The achieved improvement with Material 3B corresponds to about 48% improvement in tool performance in relation to Material 3A. Material 3B with a bi-modal CBN grain size significantly improved tool life in cutting operation which involved severe abrasion wear by improving the materials abrasive wear resistance.

The invention claimed is:
1. A composition comprising:
about 45 to about 75 volume % of cubic boron nitride (CBN), where the CBN consists of finer and coarser particles having two different average particle sizes, the range of the average particle size of the finer particles being about 0.1 to about 2 μm, the range of the average particle size of the coarser particles being about 0.3 to about 5 μm, the ratio of the content of the coarser CBN particles to the finer CBN particles being 50:50 to 90:10;

a secondary hard phase comprising a nitride or carbonitride of a Group 4, 5 or 6 transition metal or a mixture or solid solution thereof, and a binder phase.

2. A composition according to claim 1, wherein the binder phase is present in an amount of about 5 to 30 weight % of the secondary hard phase.

3. A composition according to claim 1 or claim 2, wherein the volume of CBN present in the composition is about 45 to 70%.

4. A composition according to claim 3, wherein the volume of CBN present in the composition is about 50 to 65%.

5. A composition according to claim 1, wherein the binder phase consists of aluminum and optionally one or more other elements chosen from silicon, iron, nickel, cobalt, titanium, tungsten, niobium and molybdenum, which one or more other elements is alloyed, compounded or formed in solid solution with the aluminum.

6. A composition according to claim 5, wherein the Group 4, 5 or 6 transition metal is titanium.

7. A method of producing a CBN compact, comprising subjecting a composition according to claim 1 to conditions of elevated temperature and pressure.

8. A method according to claim 7, wherein the conditions of elevated temperature and pressure are a pressure of about 2 GPa to about 6 GPa and a temperature in the range of about 1100° C. to about 2000° C.

9. A method according to claim 7, wherein the conditions of elevated temperature and pressure are a pressure of about 4 to 6 GPa and a temperature of about 1200° C. to 1600° C.

10. A CBN compact produced by the method of claim 7.

* * * * *